United States Patent [19]
Holzmann

[11] 3,856,255
[45] Dec. 24, 1974

[54] APPARATUS FOR THE FABRICATION OF INJECTION-MOLDED OR DIE-CAST ARTICLES

[75] Inventor: Wilfried Holzmann, Torkenweiler, Germany

[73] Assignee: Firma Hasco Normalien Hasenclever & Co., Ludenscheid, Germany

[22] Filed: Aug. 31, 1972

[21] Appl. No.: 285,308

[30] Foreign Application Priority Data
Sept. 9, 1971  Germany............................ 21450420

[52] U.S. Cl.................... 249/59, 249/102, 425/190, 425/438
[51] Int. Cl.............................................. B29f 1/14
[58] Field of Search............ 425/438, 190, 192, 59; 249/59, 102

[56] References Cited
UNITED STATES PATENTS

| | | | |
|---|---|---|---|
| 2,984,862 | 5/1961 | Chabotte | 425/438 X |
| 3,156,008 | 11/1964 | Martin | 425/438 X |
| 3,388,431 | 6/1968 | Aoki | 425/163 |
| 3,712,786 | 1/1973 | Aoki | 425/438 |
| 3,719,446 | 3/1973 | Cleevely | 425/438 X |

*Primary Examiner*—Andrew R. Juhasz
*Assistant Examiner*—David S. Safran
*Attorney, Agent, or Firm*—Ernest G. Montague; Karl F. Ross; Herbert Dubno

[57] ABSTRACT

An apparatus for the fabrication of injection-molded or die-cast articles equipped with a thread, e.g. such articles as screw-closing caps. The apparatus comprises an injection-molding tool unit including forming sets for the articles to be injection-molded and a driving unit which includes at least one drive pinion. A threaded core is disposed on the side of the injection-molding tool unit. The drive pinion serves for the removal of the threaded core. The driving unit is designed as an independent drive set, separate from the injection-molding tool unit and useable independently. The drive pinion is releasably connectable together with the threaded core provided separately on the side of the injection-molding tool from the drive set by coupling means.

5 Claims, 3 Drawing Figures

APPARATUS FOR THE FABRICATION OF INJECTION-MOLDED OR DIE-CAST ARTICLES

The present invention relates to an apparatus for the fabrication of injection-molded or die-cast articles equipped with a thread, such as threaded caps and an apparatus of this type generally comprises an injection-molding forming unit including one or more form or mold inserts for the articles to be injection molded, and a driving unit including one or more pinions for the screw removal of threaded cores disposed on the forming side.

The apparatus comprises a forming side and a driving side, which are combined in a structural unit and are dependent upon each other. The threaded cores, which make possible a forming of injection-molded articles, are united with pinions disposed on the driving side to a connected, integral structural unit. In this structure, each forming tool must include a driving unit which is useable only for an article to be injection molded in the forming tool. The driving units, because of the structural connection. The drive pinions to the threaded cores, are capable of being used for this single forming tool only. Because of the interdependence between the drive pinions and the threaded cores, such forming tools are appreciably cumbersome and expensive, since the driving unit must be especially designed for the forming tool.

An interchange of driving units is not possible.

It is, therefore, the primary object of the present invention, to provide an apparatus of simplified construction in which the driving unit with the pinions is independent of and detachable from the forming unit.

According to a feature of the present invention the driving unit equipped with drive pinions is designed as independent drive set, which is separable from and used independently of the injection-molding forming tool unit. The drive pinions of the driveset are releasably and removably connectable, by means of coupling means, with the threaded cores. The latter are provided separately from the drive set on the side of the injection-molding forming tool.

According to still another feature of the present invention, one and the same driving unit can be used not only for a single forming tool with predetermined injection-molded articles, rather the new driving unit can be applied universally for different forming tools with different types of articles, because the threaded cores and the drive pinions are separable from each other, i.e., do not constitute an integral and connected structural unit dependent upon each other, as has been the case heretofore.

The fact that the forming and driving units in accordance with the present invention can be separated and reconnected in different combinations as required represents a very economical solution to the problem of fabricating different threaded parts by the process of injection-molding. Thus the apparatus according to the present invention is suitable for universal application. The user of the apparatus is in a position to employ one driving unit for all threaded cores as required for the different parts to be fabricated. The requirement of a special driving unit for each set of molds is thus eliminated.

In accordance with a further feature of the present invention a high degree of standardization of construction is provided. The construction of the detachable driving pinions makes standardized driving structures possible. The outline dimensions of a forming unit as part of the apparatus can be chosen to fall within pre-established standard values. It is also possible to select the number of drive pinions in the driving units to correspond with the largest permissible number of forming sets that may be accommodated inside a forming unit of standard overall dimensions, so that, depending on the parts to be manufactured, only one pinion or any number of such pinions within the maximum number available in the driving unit can be used.

Heretofore it has been the general practice to standardize the forming tools, that is to divide them into different groups with different dimensions. One of the objects of the present invention is to accomplish standardization also for the driving unit as a whole, in that the unit can also be dimensioned and shaped to accommodate a number of molds of standard sizes. It is also possible to work with forming and driving units as actual building blocks.

The standardized driving structure is designed in such manner that it can be fitted with a number of driving pinions that correspond to the maximum number of molds that can be accommodated inside a forming unit of standardized dimensions.

Practically, this means that the driving side of the apparatus is always designed for optimum usage, regardless of whether all driving pinions are used with all forming tools. With driving units standardized in this way, it is possible to adapt the apparatus to the actual requirements.

By way of example, it is possible to operate one and the same standardized unit with its threaded cores in conjunction with only two forming tools as well as with more than two forming tools. It is also possible to use either one driving pinion alone, a group of driving pinions or a number corresponding to a multiple of a driving group or also all pinions jointly. This could not be accomplished with the existing system of forming units which were dependent on the driving units.

Because of the standardization of the driving units, it is now practical to use only one standardized driving structure for each standardized forming unit, to which it is adapted.

A releasable coupling between the driving pinions of the driving unit and the threaded cores of the forming unit may be attained in practice in a manner such that an axially projecting pin is provided between the drive pinions and the threaded cores on one of the two structure parts to be coupled, for example, a coupling reception is provided on the drive pinions and a projecting pin or stay is provided on the other or counter structure part, for example, the threaded core, or the projection pin entering the coupling reception on the pinion side.

In a particularly practical embodiment the releasable coupling means, comprises a coupling groove on one side and an engaging projecting shaft on the other side. This structure constructively simple and meets all the mechanical requirements of the driving and driven structures. Assembling and handling of this type of coupling means is also simple and easy.

In order to provide an axial securing safety of the two members to be coupled, it is advantageous to arrange a screw, which is centrally located and penetrates through a coupling region of the driving pinion in the threaded core.

In this manner a simple holding member is used which is easily to be mounted and during change of the forming tool is easily disassembled.

I also provide a supporting ring, pressfitted around the extension of the driving pinion, in which the coupling groove is located, for the purpose of reinforcing the part that may be weakened by the presence of the groove and making it suitable to stand mechanical abuse.

The above objects and other will become more readily apparent from the following description, reference being made to the accompanying drawing, in which.

Figure 1:
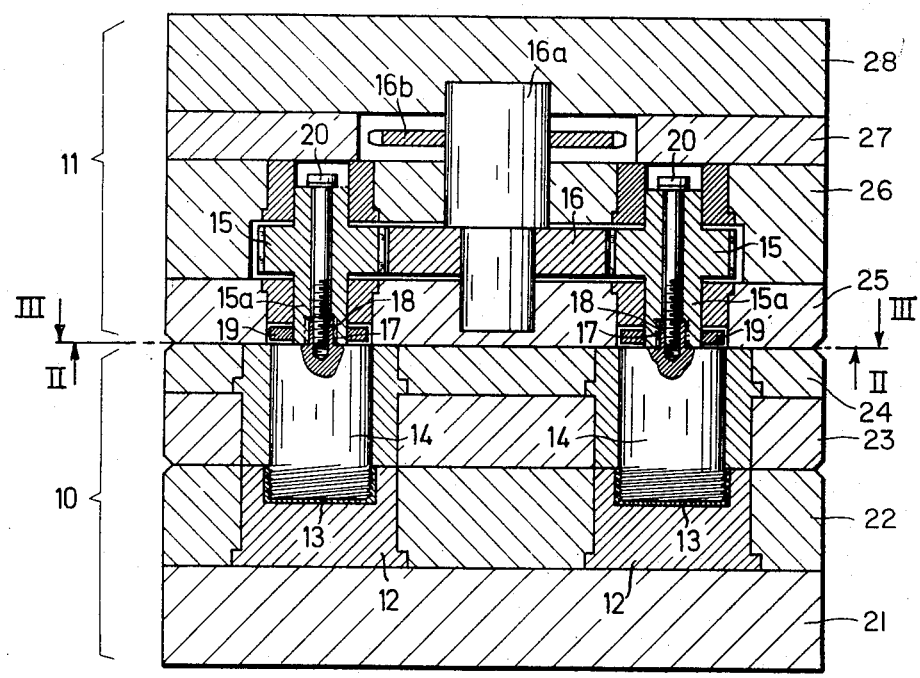
FIG. 1 is a greatly simplified and schematic elevation of the apparatus, partly in section.

The device of the present invention comprises the forming side 10, which is the forming tool proper, and the driving side constituted by the driving unit 11.

The forming side 10 comprises a plurality of plates 21, 22, 23, 24 of conventional design as normally used in this type of apparatus, held together by conventional means and not described further herein. The driving side 11 contains also a plurality of plates 25, 26, 27 and 28, connected together in conventional manner. It is in the forming tools or forming-opening sets 12 of the forming side that the articles 13, for example threaded end caps, are fabricated.

For the fabrication of these threaded end caps 13, the threaded cores 14 are necessary; the latter must be unscrewed after the injection-molding of the articles 13 for their removal from the molding tools.

The operation of unscrewing the cores 14 is done by means of the driving pinions 15 of the driving side 11 of the apparatus.

The driving pinions 15 are centrally driven by a common driving gear 16 via a shaft 16a which in turn is connected with a sprocket wheel 16b (not shown) of the main drive. According to the present invention, the driving unit 11 constitues a separate structure unit independent of the forming unit 10. The structure unit can be universally used, not only in conjunction with a given forming tool, but with different tools with different articles. The driving unit 11 is releasably coupled with the forming side. Thus the driving pinions 15 are each provided with male coupling means which operatively engage female coupling means provided in the threaded cores 14.

As can be seen in FIG. 1, the driving unit 11 is adjusted to the same contour and matching surface dimensions of the forming unit 10. In other words, the driving unit is built as a standardized structure to correspond to the forming unit, which is also built as a standardized structure.

Figure 2:
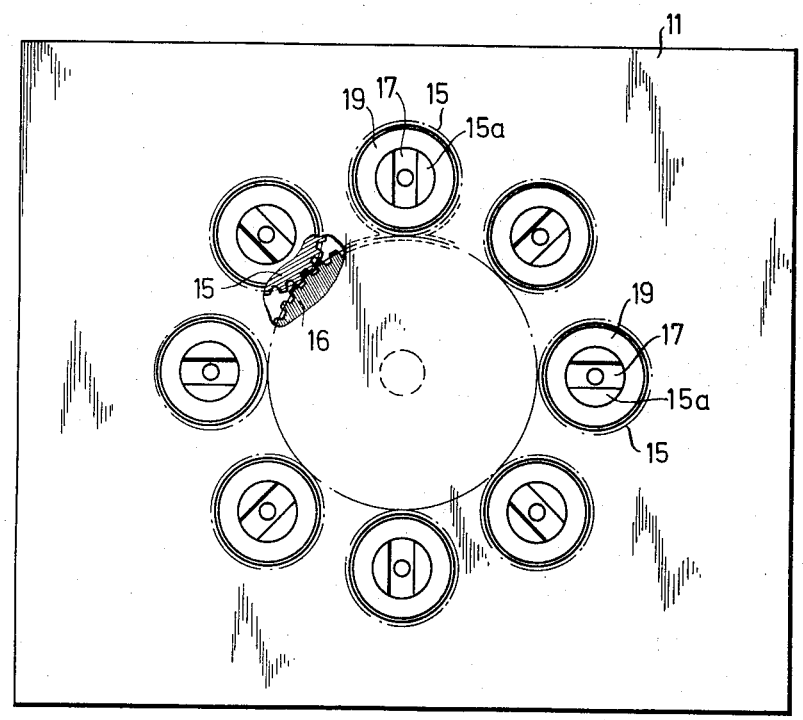
FIG. 2 is a plan view of the driving side of the apparatus taken along the line II—II of FIG. 1.

As can be determined from FIG. 2, the driving unit is equipped with eight driving pinions 15 with axes provided along a common circle and equally spaced about this circle. This is the maximum number of pinions that can be fitted in the driving unit of this embodiment.

It should be mentioned as a matter of course that it is possible to depart from the number of eight pinions; depending upon the size of the driving units, less but also more pinions may be provided.

Figure 3:
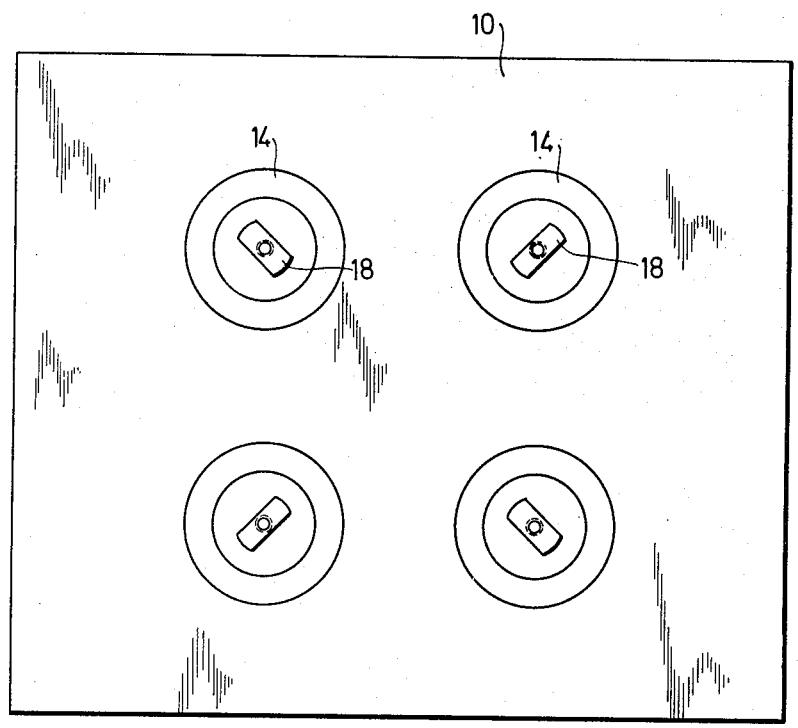
FIG. 3 is a plan view of the forming side of the apparatus taken along the line III-III of FIG. 1.

FIG. 3 discloses the forming side 10, wherein only four threaded cores 14 are provided. Correspondingly, also only four forming sets 12 are provided within the forming unit. Obviously in the driving unit 11 depicted only those four threaded cores 14 of this tool can be served in this forming unit. This means that the remaining four driving pinions of the driving unit are unused. However, it is possible to depart from this embodiment shown as an example and to provide less or more than four molding tools in the forming unit, so that also a larger or smaller number of the threaded cores can be served with the same driving unit. The number of molding tools represented is shown only by way of example and the circle on which the molds are mounted could be divided by three, just as well.

For the purpose of coupling the driving unit 11 with the forming unit 10 the, driving pinions 15 are equipped on their front ends with coupling grooves or receiving members 17, opening at the plane of the diameter interface between the units and which extend over the entire length of the diameter of the axial projections 15a of the driving pinions.

On the other hand, the threaded cores 14 are equipped on their coupling side with axially projecting stay flanges or ribs 18, which are shaped such to snugly fit forcibly in the grooves 17 of the pinions 15. The coupling region is surrounded by support rings 19, which are mounted by press fit.

A holding screw 20 passes through a clearing hole in each pinion 15. The end of this screw 20 engages a threaded hole in the core 14. In this way an axial securing with respect to each other is obtained.

When it is desired to use the driving unit 11 in accordance with the present invention with another forming unit, it is necessary to unscrew the holding screws 20 to de-couple the threaded cores 14 from the driving pinions 15. It is then possible to use the driving unit 11 with a further forming unit for the fabrication of other injection-molded articles, requiring different threaded cores. All that is necessary is to couple again the driving pinions with the threaded cores of the forming unit now to be used. The number of the threaded cores, which must be served by the driving pinions, is also of secondary importance, because the driving side is always set for the maximum number of cores.

It is to be understood that the shown and described embodiment constitutes a mere example for the practical realization of the present invention. The present invention is not limited to the shown embodiment. Many more embodiments are possible within the scope of the present invention, particularly in regard to the detailed structure of the coupling means.

I claim:

1. An apparatus for the fabrication of ejection-molded or die-cast articles equipped with a thread, such as screw-closing caps, comprising:
   a molding unit including
      a body,
      a plurality of forming sets in said body defining openings for forming articles to be molded therein, and
      respective cores rotatable in said body and having threaded portions at one end of each core receivable in said opening and engageable by the article to be molded therein; and
   a driving unit including
      a housing, a plurality of driving pinions in said housing alignable with said cores upon juxtaposition of said units, common drive means in said housing for rotating said pinions, and coupling means for operatively and releasably connecting together said drive pinions and the corresponding cores, said driving unit constituting an independent drive set adapted to be a dismounted from said molding unit and usable independently thereof, said drive pinion and the respective threaded cores being formed with complementarily shaped structural parts, one of said parts including a receiving member and the other of said parts forming a stay flange axially projecting from the other of said structural parts and engaging snugly in said receiving member.

2. The apparatus defined in claim 1 wherein said receiving member is a coupling groove extending diametrically over part of the axial depth of the respective pinion adjacent the respective threaded core, said cores having said stay flanges thereon and being dimensioned to be complementary to the respective groove to form a force-fitted snug engagement with the respective coupling groove.

3. The apparatus defined in claim 1 wherein said coupling means includes a single screw for each of said cores and extending through the respective drive pinion into threaded engagement with the respective core.

4. The apparatus defined in claim 3 wherein each of said grooves is provided in a pin projection of the respective drive pinion, said apparatus further comprising supporting rings surrounding said pin projections in the region of the respective grooves.

5. The apparatus defined in claim 1 wherein said housing and said body have coextensive juxtaposed faces of the same dimensions and are formed as standard size units.

* * * * *